United States Patent
Cassisa et al.

(10) Patent No.: US 6,586,539 B2
(45) Date of Patent: Jul. 1, 2003

(54) POLYMERIZATION CONTROL PROCESS

(75) Inventors: Eric Cassisa, Lavera (FR); Jean-Claude Chinh, St Mitre Les Remparts (FR); Stephen Kevin Lee, London (GB)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/863,430

(22) Filed: May 24, 2001

(65) Prior Publication Data

US 2002/0004564 A1 Jan. 10, 2002

Related U.S. Application Data

(63) Continuation of application No. PCT/GB99/03964, filed on Nov. 26, 1999.

(30) Foreign Application Priority Data

Nov. 30, 1998 (EP) ............................................. 98430026

(51) Int. Cl.⁷ .................................................. C08F 2/34
(52) U.S. Cl. .............................. 526/74; 526/68; 526/60
(58) Field of Search .............................. 526/60, 68, 74, 526/901

(56) References Cited

FOREIGN PATENT DOCUMENTS

| EP | 0 692 495 B1 | 1/1996 |
|---|---|---|
| EP | 0 849 285 A2 | 2/1996 |
| EP | 0 695 313 B1 | 1/1998 |
| EP | 0 855 411 A1 | 7/1998 |
| WO | WO94/25495 | 11/1994 |
| WO | WO 9425495 | * 11/1994 |
| WO | WO94/28032 | 12/1994 |
| WO | WO95/22565 | 8/1995 |
| WO | WO96/10590 | 4/1996 |
| WO | WO96/41822 | 12/1996 |
| WO | WO98/27124 | 6/1998 |
| WO | WO99/12981 | 3/1999 |

* cited by examiner

Primary Examiner—David W. Wu
Assistant Examiner—William K. Cheung

(57) ABSTRACT

A process for controlling a continuous fluidised bed reactor (co-)polymerisation process which comprises (1) withdrawing from the reactor a hot recycle stream containing a principal monomer and at least one other unreacted reactant, (2) cooling part or all of the recycle stream withdrawn from the reactor, and (3) recycling part or all of the cooled recycle stream containing the principal monomer and the unreacted reactant(s) through the polymerisation zone in the reactor in the presence of a polymerisation catalyst under reactive conditions, wherein the controlling process consists in maintaining at least one of the reactant gradients ($Gri$) within a range of values outside which sheeting or unstable operations would otherwise occur.

19 Claims, No Drawings

POLYMERIZATION CONTROL PROCESS

This application is a continuation of international application number PCT/GB99/03964, filed Nov. 26, 1999.

The present invention relates to a continuous process for controlling the gas-phase co-polymerisation of olefins in a fluidised bed reactor.

Processes for the co-polymerisation of olefins in the gas phase are well known in the art. Such processes can be conducted for example by introducing the gaseous monomer and comonomer into a stirred and/or gas fluidised bed comprising polyolefin and a catalyst for the polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst may become inactive or the bed commence to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas or liquid to the polymerisation zone or reaction loop.

A gas fluidised bed polymerisation reactor is typically controlled to achieve a desired melt index and density for the polymer at an optimum production. Conditions within the polymerisation reactor have to be carefully controlled to reduce the risk of agglomerate and/or sheet formation which may ultimately lead to bed instabilities and a need to terminate the reaction and shut down the reactor. This is the reason why commercial scale reactors are designed to operate well within proven stable operating zones and why the reactors are used in a carefully circumscribed fashion.

Even within the constraints of conventional, safe operation, control is complex adding further difficulty and uncertainty if one wishes to find new and improved operating conditions.

There is no generally accepted view as to what causes agglomerates or sheeting. Agglomerates or sheets can, for example, form when the polymerisation temperature is too close to the polymer sintering temperature or when the polymer particles become excessively sticky. Highly active fine particles can, for example, concentrate in the upper elevations of the polymerisation zone, towards the top of the fluidised bed and in the powder disengagement zone above the bed thus leading to local hot spots and potential agglomeration and/or sheeting.

It is known that the powder disengagement and velocity reduction zones of the reactor are particularly vulnerable to sheet formation and there have been many attempts to mitigate these effects.

EP-0692495 discloses a method for polymerising olefins in a gas phase reactor having an expanded section wherein a tangential flow of gas is introduced into the expanded section in order to reduce fines entrainment and to reduce solid particle build-up on the interior surfaces of the expanded section.

EP-0695313 discloses a continuous process for the gas phase polymerisation of olefins in a fluidised bed reactor comprising a polymerisation zone and a gas velocity reduction zone situated above the bed wherein the make-up monomers are directly sent to the fluidised bed reactor in one or more points above the fluidised bed. This process is presented as a general solution to the fouling problems occurring in the reactor system.

BP patent EP-0 855 411 discloses a process for continuous gas phase polymerisation of olefin(s) in a reactor containing a fluidised bed, consisting of a cylinder with a vertical side wall and of a desurging or disengagement chamber (3) mounted above the said cylinder, characterised in that the fluidised bed occupies at least all of the cylinder with a vertical side wall of the reactor. This process not only allows to increase the output efficiency of industrial plants but also to reduce the fouling phenomenon experienced in the past.

WO 94/25495 describes a method of determining stable operating conditions for a fluidised bed polymerisation process which comprises: (a) observing fluidised bulk density changes in the reactor associated with changes in the composition of the fluidising medium; and (b) increasing the cooling capacity of the recycle stream by changing the composition without exceeding the level at which a reduction in the fluidised bulk density or a parameter indicative thereof becomes irreversible. The aim of this invention is to control the stability of operation of the fluidised bed by monitoring and controlling conditions within the fluidised bed itself.

Existing continuous gas fluidised bed processes have demonstrated that high space time yield polymerisations can be reached. One of the major problems encountered with these high space time yield polymerisation processes is to ensure a good control of the operating conditions leading to a safer use of the process;

The present invention provides means to monitor and control stability of the entire polymerisation zone, not just that within the fluidised bed which consists essentially in the well mixed region. It is desirable to provide a method of defining stable operating conditions to minimise potential for sheet formation especially outside of the well mixed region in the fluidised bed, particularly for high space time yield polymerisation processes.

It is therefore an objective of the present invention to provide criteria to determine a stable operating envelope for a gas phase polymerisation process of two or more reactants and to run the process safely with low risk of malfunction, for example agglomeration or sheeting or off-specification polymer, particularly at high space time yields.

Although it is known that a fluidised bed ensures good solids mixing and good heat transfer, it has been found that control of variations in reactant gaseous concentrations within the polymerisation zone is key to the prevention of agglomerate or sheet formation and optimisation of stable and safe operating envelope, including uniform product properties, particularly at high space time yields. This control also enables safe and stable increase in the conversion of reactants per pass of the recycle stream even at lower space time yields.

The ability to operate safely at higher conversions per pass of the recycle stream enables the fluidisation velocity to be reduced below what may otherwise have been possible, subject nevertheless to satisfying potential further requirements associated with heat removal and ensuring good bed mixing. This invention provides opportunity therefore for the energy requirement of the recycle gas compressor to be reduced.

The reactant consumption through the polymerisation zone is typically different for each reactant. This, amongst other factors, leads to a difference in composition of reactants between the inlet and outlet of the polymerisation zone. Variations and changes in reactant gaseous compositions through the polymerisation zone result in a range of instantaneous polymer properties being produced within the reactor. It is known that particles circulate rapidly throughout the fluidised bed and that the bed solids are considered to be well mixed. Variations in instantaneous polymer properties within the bed generally cause no operating or product quality issues since the properties of any single particle formed will be a homogeneous average resulting from the rapid bed circulation rates. However particles can remain longer in certain regions of the polymerisation reactor which do not experience such high degrees of solids mixing. For example, the solids in the powder disengagement and velocity reduction zones do not experience such good circulation through the whole fluidised bed and in these areas it has been found that there can be formation of polymer of significantly different polymer properties from that formed within the well mixed regions of the bed. This leads to non-optimal control of product properties, thereby adversely influencing product quality. This also increases the potential for formation of fines, agglomerates and sheets in these regions which can ultimately lead to loss of stability of the fluidised bed. Even though the polymer being produced within the fluidised bed may be closely controlled to have a sintering temperature a safe margin above the bed operating temperature, it has been found that changes in the composition of gaseous reactants through the polymerisation zone can lead to formation of polymer in these less well mixed regions of the reactor (e.g. in the bulb) with a sintering temperature dangerously close to, if not below the bed operating temperature. This clearly increases the risk of sheet and agglomerate formation.

The polymer sintering temperature varies with the polymer properties and is particularly sensitive to density. It has been found that the improvement provided by this invention in the control of the polymer density instantaneously produced at any point within the polymerisation zone is particularly significant in avoiding the occurrence of off-specification materials and particularly in reducing the agglomerate formation and the subsequent disruption to fluidisation stability. Polymer density is particularly sensitive to the ratio of reactants, and most particularly monomers, within the polymerisation zone.

The reactant gradient (Gri) has been found to be a simple and effective property in monitoring and maintaining control of polymer properties throughout the polymerisation zone and thereby optimising the stability of the fluidised bed and control of the overall polymerisation process.

Thus, according to the present invention, there is provided a process for controlling a continuous fluidised bed reactor (co-)polymerisation process which comprises 1. withdrawing from the reactor a hot recycle stream comprising a principal monomer and at least one other unreacted reactant,
2. cooling part or all of said recycle stream withdrawn from said reactor, and
3. recycling part or all of said cooled recycle stream comprising the principal monomer and the unreacted reactant (s) through the polymerisation zone in said reactor in the presence of a polymerisation catalyst under reactive conditions, characterised in that the said controlling process consists in maintaining at least one of the reactant gradients (Gri) within a range of values outside which sheeting or unstable operations would otherwise occur.

For the purposes of the present invention and appended claims, the polymerisation zone means the reaction zone consisting of the fluidised bed (where most of the solids are typically well mixed), and in the region above the fluidised bed which consists of the powder disengagement zone and/or the velocity reduction zone (where the solids can, typically, be less well mixed).

For the purposes of the present invention and appended claims, the principal monomer is the monomer of the largest molar concentration in the gaseous stream.

The reactant gradient (Gri) is a ratio defined as $$Gri=(Ci/Cm)_{z2}/(Ci/Cm)_{z1}$$

wherein:
(Ci/Cm) is the molar ratio between reactant i and the principal monomer concentrations in the gaseous stream,
z1 represents conditions at elevation z1 within polymerisation zone, and
z2 represents conditions at elevation z2 within polymerisation zone and z2 is downstream of z1 (i.e. at a higher elevation).

These concentrations represent the total concentration of the reactants. The reactants are in this case defined as any components of the recycle gas which take part in the polymerisation reaction and whose composition in the gas phase is altered during the reaction. The reactants would typically consist principally of monomers, comonomers and hydrogen and the reactant gradients most usefully controlled would consist of the comonomer gradients (Grc) and the hydrogen gradient (Grh).

It will be apparent that it may be desirable or necessary to calculate the composition of each reactant at various elevations within the polymerisation zone. This requires calculation (or estimation) of a) the amount of gas back-mixing in the fluidised bed and b) the manner in which any liquid feeds to the reactor circulate and vaporise within the polymerisation zone upon entry. There are existing methods known in the art for estimating these phenomena, however it has been found that in most cases significant simplifying assumptions may be taken which still allow the benefits to the invention to be taken advantage of. Firstly, with respect to gaseous feeds to the reactor, in this instance a simplifying assumption may be taken that there is no significant back-mixing of gases within the polymerisation zone and that any gaseous feeds, once dispersed, flow in broadly 'plug flow' upwards with the recycle stream. Secondly, any liquid fed to the fluidised bed will tend to become entrained on the circulating bed solids and vaporisation will then take place as the solids circulate through the bed. With respect to the liquid feeds to the reactor, a simplifying assumption may therefore be taken that liquid feeds to the fluidised bed are uniformly distributed through the whole bed. This has the effect that as liquid rates to the reactor are increased, so the comonomer gradient effect within the bed decreases. Calculation of the effect of liquid feeds to the polymerisation zone above the fluidised bed requires more attention. It will be necessary to estimate the amount of any liquid feed which is capable of vaporising within the polymerisation zone above the bed (taking into account heat transfer consideration e.g. due to liquid quantity, temperature driving force and droplet size), this quantity will then serve to correct any comonomer gradient in these less well mixed regions of the fluidised bed. Any liquid introduced into these less well mixed regions above the level which is not able to be vaporised still serves to reduce agglomeration and/or sheeting by assisting in knocking fine particles out of the recycle gases exiting the fluidised bed and in serving to 'wash' fine particles from the walls of the velocity reduction zone. Depending upon the droplet size of liquid introduced above the fluidised bed which is not vaporised, the drops will either leave the reactor with the recycle gases or will ultimately fall back into the bed and be uniformly distributed within the bed. It will thus be readily apparent that the manner of re-introduction of liquid into the less well mixed region above the fluidised bed will impact on the manner and extent to which full advantage may be taken from this invention. The preferred means of liquid re-introduction into the region above the fluidised bed is to do so as a fine spray of liquid (introduced preferably with a twin-fluid nozzle, although a liquid only nozzle is also feasible). The nozzle spray pattern should preferably be designed to cover the majority of the cross-sectional area of the reactor but to minimise the quantity of liquid which impacts directly onto the walls of the reactor. Since execution of this invention has the further desirable benefit that liquid which is entrained out of the reactor with the recycle gases will serve to help wash the recycle piping and thereby minimise the risk of pipe and exchanger fouling through the reaction loop, it may be advantageous to design and operate the system to control not only the comonomer gradient within the reactor, but also to independently control the amount of make-up or recycle liquid leaving the reactor.

According to a preferred embodiment of the present invention, the control is made on one or more of the comonomer Grc gradient(s) and/or on the hydrogen Grh gradient, ideally on all the comonomer gradients and on the hydrogen gradient.

In a preferred embodiment z2 and z1 refer to outlet and inlet conditions respectively. Namely the above ratios are measured or calculated at the reactor outlet (i.e. before any stream is taken out from the main recycle loop) and the reactor inlet (after every stream fresh/recycled has been added to the main recycle loop flow) of the polymerisation zone.

In case of no polymerisation and polymer withdrawal taking place in the reactor, the inlet and outlet ratios will be the same resulting in gradients being equal to 1.

When polymerisation and/or polymer withdrawal takes place, three phenomena potentially occur which lead to these ratios being different than 1:

A. The first phenomenon reflects the relative reactivity of the different reactants towards the polymerisation reaction and their relative incorporation in the polymer.

For example, in the production of copolymers of ethylene, using Ziegler Natta catalyst and a given reactor inlet composition, relatively more ethylene than comonomer is typically incorporated into the polymer in the polymerisation zone thus resulting in a modification of the relative proportion of each component at the inlet/outlet of the reactor. Relative to ethylene, there will thus be more comonomer at the top of the reactor than at the bottom, thus resulting in values of gradients above 1. The increased ratio of comonomer to ethylene will lead to polymer of lower density and higher melt-index being formed at this point in the polymerisation zone.

B. The second phenomenon relates to the difference of absorption rates on the polymer, e.g. of comonomer(s) and ethylene. As a general rule, the heavier the hydrocarbon, the more it is absorbed on the powder leaving the reactor. For the above Ziegler Natta catalyst example, this second phenomenon counteracts the first one as it will reduce the relative amount of comonomer to ethylene in the gas phase at the top of the reactor.

C. The third phenomenon relates to the potential side-reactions leading to the formation of monomer(s) and/or hydrogen within the polymerisation zone. This phenomena is particularly relevant during polymerisation using metallocene catalysts.

These phenomena result, for example, during ethylene copolymerisation using Ziegler Natta catalyst, in comonomer and hydrogen gradients (Grc and Grh) values above 1.

The polymer formed within the bed will be based on the average of the gradient in reactant conditions through the bed, the polymer formed in the bulb will tend to be based principally on the reactor exit conditions.

According to a preferred embodiment of the present invention, the Applicants have unexpectedly found the control of stable operating conditions during the polymerisation process is obtained by maintaining the reactant gradient (Gri) at a value between 0.7 and 1.3, preferably between 0.9 and 1.1 and most preferably between 0.95 and 1.05.

In addition to the comonomers and hydrogen gradients, a separate reactant gradient for each of the 'minor' reactants involved in the polymerisation reaction may advantageously also be maintained within the above ranges.

While not wishing to be bound by a theoretical explanation, the Applicants believe that the maintenance of the reactant gradient (Gri) at values within those predefined limits allows production of polymers showing constant physical properties with time while any increase/decrease of the reactant gradient (Gri) beyond said predefined limits may provoke unstable operating conditions often resulting in the formation of agglomerates, sheeting or off-specification polymer.

A preferred means of monitoring the reactant gradient (Gri) consists in the measurement of the gas phase composition at one point in the recycle gaseous stream loop (via a gas phase analyser). In this respect, the gas analyser is ideally situated before any liquid is condensed into the loop (to ensure accuracy and reproducibility of the measurement). The gas phase composition at the inlet of the reactor (i.e. the mixture of gas and any condensed liquid), at any point within the polymerisation zone and at the reactor outlet can be rebuilt mathematically by a mass balance between the point of analysis and the inlet/outlet of the reactor taking into account any fresh feeds/recycle streams which are added between the point of analysis and the reactor inlet/outlet.

The mass balance within and across the reactor is a standard chemical engineering calculation which mainly takes into account:
the conversion of reactants to polymer,
the absorption of reactants on the polymer leaving the reactor, and
the formation of reactants within the polymerisation zone The man skilled in the art will be capable of determining safe operating limits and maintaining the value of the reactant gradients (Gri) within the predefined limits by appropriately selecting reaction process conditions and by appropriately designing polymerisation reaction systems to ensure operation within these predefined limits. The choice of the preferred design for the reaction system and/or the preferred operating conditions to act on may depend on the plant design, the catalyst system, the polymerisation temperature, etc.

According to a simple and preferred method of the present invention, once the usual operating conditions have been selected for the manufacture of a given polymer grade, if the monitoring of the reactant gradient (Gri) indicates a dangerous decrease/increase approaching the limit value then one or more actions can be taken.

Thus, according to another embodiment of the present invention, there is provided a process for controlling a continuous fluidised bed reactor (co-)polymerisation process which comprises
1. withdrawing from the reactor a hot recycle stream comprising a principal monomer and at least one other unreacted reactant,
2. cooling part or all of said recycle stream withdrawn from said reactor, and
3. recycling part or all of said cooled recycle stream comprising the principal monomer and the unreacted reactant (s) through the polymerisation zone in said reactor in the presence of a polymerisation catalyst under reactive conditions,
characterised in that the reactant gradient (Gri) is determined and controlled in order to maintain said reactant gradient (Gri) within a range of values outside which sheeting or unstable operations would otherwise occur.

This control can be especially made through one or more of the following actions:
a) adjustment of the principal monomer partial pressure,
b) adjustment of the total flow through the polymerization zone,
c) adjustment of the production rate,
d) adjustment of the reaction temperature.

An inert hydrocarbon may be added to the reaction gases in order to increase the heat removal from the polymerisation zone or to increase the catalyst activity or to increase the inert hydrocarbon absorption into the polymer. Hydrocarbon absorption in the polymer is subject to multi-component interaction effects, so the degree of absorption of, for example, the inert hydrocarbon, can also affect the degree of absorption of reactants, particularly co-monomers.

In this respect, a further embodiment of the present invention, consists in controlling the reactant gradient (Gri) through adjustment of the inert hydrocarbon concentration.

For example, the inert hydrocarbon can be chosen amongst one or more of the $C_2$–$C_8$ alkane(s) or cycloalkane (s), particularly butane, pentane or hexane.

In an alternative embodiment of the present invention, it was surprisingly found that the conditions within the less well mixed zones of the reactor (i.e. essentially above the fluidised bed towards the top of the polymerisation zone) may be independently adjusted such that the previously defined gradient limit may be safely exceeded within the well mixed areas of the fluidised bed whilst maintaining the conditions in the less well mixed areas such that agglomeration, sheeting or off-specification polymer are avoided.

It will also be readily apparent that it is possible to introduce fresh or recycled monomers and/or inerts (liquid or gaseous) at various elevations within the polymerisation zone including above the fluidised bed in order to control the reactant gradient within these less well mixed zones to within established safe operating limits.

In this respect, a further embodiment of the present invention consists in controlling the reactant gradient (Gri) through adjustment of the introduction of an additional stream into the polymerisation zone. This additional stream may comprise for example liquid or gaseous (co-)monomers or inerts.

The hot recycle stream withdrawn from the reactor comprises unreacted gaseous (co)monomers, and optionally, inert hydrocarbons, inert gases such as nitrogen, reaction activators or moderators such as hydrogen, as well as entrained catalyst and/or polymer particles.

The cooled recycled stream fed to the reactor additionally comprises make-up reactants (gaseous or liquid) to replace those reactants polymerised in the polymerisation zone.

The process according to the present invention is suitable for the manufacture of polymers in a continuous gas fluidised bed process.

Illustrative of the polymers which can be produced in accordance with the invention are the following:
SBR (polymer of butadiene copolymerised with styrene),
ABS (polymer of acrylonitrile, butadiene and styrene),
nitrile polymer of butadiene copolymerised with acrylonitrile),
butyl (polymer of isobutylene copolymerised with isoprene),
EPR (ethylene/propylene rubber),
EPDM (polymer of ethylene copolymerised with propylene and a diene such as hexadiene, dicyclopentadiene or ethylidene norborene),
copolymer of ethylene and vinyltrimethoxy silane, copolymer of ethylene and one or more of acrylonitrile, maleic acid esters, vinyl acetate, acrylic and methacrylic acid esters and the like.

In an advantageous embodiment of this invention, the polymer is a polyolefin preferably copolymers of ethylene and/or propylene and/or butene. Preferred alpha-olefins used in combination with ethylene and/or propylene and/or butene in the process of the present invention are those having from 4 to 8 carbon atoms. However, small quantities of alpha olefins having more than 8 carbon atoms, for example 9 to 40 carbon atoms (e.g. a conjugated diene), can be employed if desired. Thus it is possible to produce copolymers of ethylene and/or propylene and/or butene with one or more $C_4$–$C_8$ alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the $C_4$–$C_8$ monomer are dec-1-ene and ethylidene norbornene. According to a preferred embodiment, the process of the present invention preferably applies to the manufacture of polyolefins in the gas phase by the copolymerisation of ethylene with but-1-ene and/or hex-1-ene and/or 4MP-1.

The process according to the present invention may be used to prepare a wide variety of polymer products for example linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene.

When liquid condenses out of the recycle gaseous stream, it can be a condensable monomer, e.g. but-1-ene, hex-1-ene, 4-methylpent-1-ene or octene used as a comonomer, and/or an optional inert condensable liquid, e.g. inert hydrocarbon (s), such as $C_4$–$C_8$ alkane(s) or cycloalkane(s), particularly butane, pentane or hexane.

The process is particularly suitable for polymerising olefins at an absolute pressure of between 0.5 and 6 MPa and at a temperature of between 30° C. and 130° C. For example for LLDPE production the temperature is suitably in the range 75–90° C. and for HDPE the temperature is typically 80–105° C. depending on the activity of the catalyst used and the polymer properties desired.

The polymerisation is preferably carried out continuously in a vertical fluidised bed reactor according to techniques known in themselves and in equipment such as that described in European patent application EP-0 855 411, French Patent No. 2,207,145 or French Patent No. 2,335, 526. The process of the invention is particularly well suited to industrial-scale reactors.

The polymerisation reaction may be carried out in the presence of a catalyst system of the Ziegler-Natta type, comprising a solid catalyst essentially comprising a compound of a transition metal and of a cocatalyst comprising an organic compound of a metal (i.e. an organometallic compound, for example an alkylaluminium compound). High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal, of magnesium and of halogen. The process is also suitable for use with Ziegler catalysts supported on silica. The process is also especially suitable for use with metallocene catalysts in view of the particular affinity and reactivity experienced with comonomers and hydrogen. The process can also be advantageously applied with iron and/or cobalt catalysts, e.g. such as those disclosed in WO98/27124 or in WO99/12981. It is also possible to use a high-activity catalyst consisting essentially of a chromium oxide activated by a heat treatment and associated with a granular support based on a refractory oxide.

The catalyst may suitably be employed in the form of a prepolymer powder prepared beforehand during a prepolymerisation stage with the aid of a catalyst as described above. The prepolymerisation may be carried out by any suitable process, for example, polymerisation in a liquid hydrocarbon diluent or in the gas phase using a batch process, a semi-continuous process or a continuous process.

The man skilled in the art is capable of calculating the density, the melt-index and also the sintering temperature of polymer that will be produced from a known catalyst system and reaction conditions.

The ratio Dn is defined as the ratio of the calculated instantaneous polymer density produced given the calculated reaction conditions at a particular point within the polymerisation zone to the average density of the polymer product.

In an alternative embodiment the reaction conditions are adjusted to ensure that the calculated ratio Dn (calculated at a series of elevations within the polymerisation zone) at any point within the polymerisation zone is between 0.95 and 1.05, more preferably between 0.99 and 1.01 and most preferably between 0.9975 and 1.0025.

In an alternative embodiment of the invention the reaction conditions are controlled to ensure that the instantaneous polymer density calculated at any point within the polymerisation zone is within the targeted sales density specification range of the polymer being produced.

The presence in the final product of even small quantities of material which is of different properties from that desired can have unacceptable impact on the use of the polymer in its final application. For example polymerisation with metallocene catalysts typically create a decreasing comonomer gradient across the reactor (the comonomer is incorporated in greater proportion than the principal monomer), this can cause higher density material to be produced in local re-circulation zones in the upper elevations of the polymerisation zone or the velocity reduction zone, this material of higher crystallinity can have significant impact on the acceptability of for example a low density blown film.

The ratio Ts is defined as the ratio of the difference between the polymerisation temperature and the calculated sintering temperature to the calculated sintering temperature.

In an alternative embodiment the reaction conditions are adjusted to ensure that the calculated ratio Ts at any point within the polymerisation zone, most particularly the ratio at reactor exit conditions is greater than 0, preferably above 0.02, most preferably above 0.04.

The ratio DTs is defined as the ratio of the difference between the polymerisation temperature and the calculated sintering temperature at reactor exit conditions to the difference between the polymerisation temperature and the calculated sintering temperature at average bed operating conditions.

In an alternative embodiment, the reaction conditions are adjusted to ensure that the ratio DTs is comprised between 0.5 and 1.5, most preferably between 0.75 and 1.25.

A further benefit of using these predefined safe operating limits is to improve the speed and safety associated with start-ups and grade transitions. When changing grades, the compositions of monomers and hydrogen and the product properties may be changing continuously, the quantity of absorption of monomers in the polymer will additionally be altered by the changing product properties (principally density) and gas composition. The control of the comonomer gradient and hydrogen gradient within tight predetermined limits enables the speed of start-ups and transitions to be improved and the production of wide-specification material and the risk of agglomerate formation to be minimised.

The following Examples will now illustrate the present invention.

COMPARATIVE EXAMPLE 1

The process is carried out in a fluidised bed gas phase polymerisation reactor consisting of a vertical cylinder of diameter 0.75 m and height 5 m and surmounted by a velocity reduction chamber. In its lower part, the reactor is equipped with a fluidisation grid and an external line for recycling gas, connecting the top of the velocity reduction chamber to the lower part of the reactor, situated under the fluidisation grid. The gas recycling line is equipped with a compressor and with a heat transfer means. Opening into the gas recycling line there are, in particular, the feed lines for ethylene, 1-butene, hydrogen and nitrogen, which represent the main constituents of the gas reaction mixture passing through the fluidised bed.

Above the fluidisation grid the reactor contains a fluidised bed consisting of a linear low density polyethylene powder. The gas reaction mixture, which contains ethylene (0.35 MPa), 1-butene (0.14 MPa), hydrogen (0.07 MPa) and nitrogen and other minor components passes through the fluidised bed at a pressure of 2.4 MPa, at 80° C. and with an upward fluidisation velocity of 0.36 m/s.

The polymerisation reactor is fitted with three sets of wall temperature indicators at 0.5 m, 1.0 m and 1.5 m above the fluidisation grid.

The catalyst used is a Ziegler-Natta catalyst prepared according to Example 1 of EP-A-0 529 977.

Under these conditions (80° C., 2.4 MPa, 0.36 m/s) a linear low density polyethylene with a density of 0.918, a melt index of 1 g/10 minutes under a 2.16-kg load at 190° C. is manufactured at an output of 250 kg/h.

Following a period of stable operation, the calculation of the C4 gradient $$Gri = (Ci/Cm)z2/(Ci/Cm)z1$$

(wherein i and m respectively represent the butene comonomer and the ethylene monomer, and z2 and z1 respectively represent reactor outlet and inlet conditions) indicates values comprised between 1.111 and 1.116. Consecutively the production of a lot of agglomerates was observed, i.e. a strong indication that the reactor was running in a region of unstable operating conditions.

EXAMPLE 2

Example 1 was repeated except that the upward fluidisation velocity was fixed at a value of 0.4 m/s and the gas phase composition was altered as follow: $pC2=0.8$ MPa, $pC4=0.32$ MPa, $pH2=0.16$ MPa.

Under these conditions, the calculation of the C4 gradient continuously indicated values comprised between 1.040 and 1.045. The reactor was smoothly running without producing any agglomerates.

What is claimed is:

1. A process for controlling a continuous fluidized bed reactor (co-)polymerization process which comprises
   1) withdrawing from a reactor having a polymerization zone a hot recycle stream containing a principal monomer and at least one other unreacted reactant,
   2) cooling part or all of said recycle stream withdrawn from said reactor,
   3) recycling part or all of said cooled recycle stream containing the principal monomer and the at least one other unreacted reactant through the polymerization zone of said reactor in the presence of a polymerization catalyst under reactive conditions, and
   4) maintaining at least one reactant gradient (Gri) within a range of values wherein sheeting or unstable operations would occur when outside of said range.

2. Process according to claim 1 wherein one or more of a comonomer Grc gradient and/or a hydrogen Grh gradient are maintained within a range of values wherein sheeting or unstable operations would occur when outside of said range.

3. Process according to claim 2 wherein all of the comonomer gradients and the hydrogen gradient are maintained within a range of values wherein sheeting or unstable operations would occur when outside of said range.

4. Process according to claim 1 wherein the at least one reactant gradient is calculated at elevations z1 and z2 which correspond to an inlet and outlet respectively of the polymerization zone.

5. Process according to claim 1 wherein the at least one reactant gradient is maintained at a value between 0.7 and 1.3.

6. Process according to claim 5 wherein the value is between 0.9 and 1.1.

7. Process according to claim 6 wherein the value is between 0.95 and 1.05.

8. Process according to claim 1 wherein a calculated ration Dn at any point within the polymerization zone is between 0.95 and 1.05.

9. Process according to claim 8 wherein the ratio Dn is between 0.99 and 1.01.

10. Process according to claim 9 wherein the ratio Dn is between 0.9975 and 1.0025.

11. Process according to claim 1 wherein a calculated ratio Ts at any point within the polymerization zone is greater than 0.

12. Process according to claim 11 wherein the ratio Ts is above 0.02.

13. Process according to claim 12 wherein the ratio Ts is above 0.04.

14. Process according to claim 1 wherein a calculated ratio Dts is between 0.5 and 1.5.

15. Process according to claim 14 wherein the ratio Dts is between 0.75 and 1.25.

16. Process according to claim 1 wherein the principal monomer partial pressure is adjusted to maintain said at least one reactant gradient (Gri) within a range of values wherein sheeting or unstable operations would occur when outside of said range.

17. Process according to claim 1 wherein a total flow through the polymerization zone is adjusted to maintain said at least one reactant gradient (On) within a range of values wherein sheeting or unstable operations would occur when outside of said range.

18. Process according to claim 1 wherein a production rate is adjusted to maintain said at least one reactant gradient (Gri) within a range of values wherein sheeting or unstable operations would occur when outside of said range.

19. Process according to claim 1 wherein an inert hydrocarbon concentration is adjusted to maintain said at least one reactant gradient (Gri) within a range of values wherein sheeting or unstable operations would occur when outside of said range.

* * * * *

UNITED STATES PATENT AND TRADEMARK OFFICE
CERTIFICATE OF CORRECTION

PATENT NO. : 6,586,539 B2
DATED : July 1, 2003
INVENTOR(S) : Eric Cassisa et al.

It is certified that error appears in the above-identified patent and that said Letters Patent is hereby corrected as shown below:

Column 12,
Line 44, "gradient (On)" should read -- gradient (Gri) --.

Signed and Sealed this

Twenty-first Day of October, 2003

JAMES E. ROGAN
*Director of the United States Patent and Trademark Office*